(12) United States Patent
Heldmann et al.

(10) Patent No.: US 11,643,137 B2
(45) Date of Patent: May 9, 2023

(54) METHOD FOR CONTROLLING A STEERING ASSIST SYSTEM OF A VEHICLE

(71) Applicant: Volvo Truck Corporation, Gothenburg (SE)

(72) Inventors: Joakim Heldmann, Hisings Backa (SE); Gustav Neander, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 79 days.

(21) Appl. No.: 17/487,399

(22) Filed: Sep. 28, 2021

(65) Prior Publication Data

US 2022/0111890 A1    Apr. 14, 2022

(30) Foreign Application Priority Data

Oct. 8, 2020  (EP) ..................... 20200787

(51) Int. Cl.
*B62D 5/065* (2006.01)
*B62D 6/00* (2006.01)

(52) U.S. Cl.
CPC ............. *B62D 6/00* (2013.01); *B62D 5/065* (2013.01)

(58) Field of Classification Search
CPC ................................ B62D 6/00; B62D 5/065
See application file for complete search history.

(56) References Cited

U.S. PATENT DOCUMENTS

| | | |
|---|---|---|
| 2015/0183457 A1 | 7/2015 | Lee et al. |
| 2019/0031236 A1 | 1/2019 | Shiraishi et al. |
| 2020/0180693 A1 | 6/2020 | Suzuki |

FOREIGN PATENT DOCUMENTS

| | | |
|---|---|---|
| CN | 105253192 A | 1/2016 |
| CN | 110723206 A | 1/2020 |
| DE | 102007054018 A1 | 5/2009 |
| EP | 3492347 A1 | 6/2019 |
| EP | 3495242 A1 | 6/2019 |

OTHER PUBLICATIONS

Extended European Search Report for European Patent Application No. 2020007878.8, dated Mar. 17, 2021, 9 pages.

*Primary Examiner* — Mathew Franklin Gordon
(74) *Attorney, Agent, or Firm* — Withrow & Terranova, PLLC

(57) ABSTRACT

The present disclosure relates to a method for controlling a steering assist system of a vehicle. Based on a signal indicative of a road characteristics of a road segment, a flow of fluid supplied by a fluid pump is controlled to generate a steering assist force to a wheel of the vehicle.

13 Claims, 3 Drawing Sheets

METHOD FOR CONTROLLING A STEERING ASSIST SYSTEM OF A VEHICLE

RELATED APPLICATIONS

The present application claims priority to European Patent Application No. 20200787.8, filed on Oct. 8, 2020, and entitled "METHOD FOR CONTROLLING A STEERING ASSIST SYSTEM OF A VEHICLE," which is incorporated herein by reference in its entirety.

TECHNICAL FIELD

The present disclosure relates to a method for controlling a steering assist system of a vehicle. The present disclosure also relates to a corresponding steering assist system. Although the method and system will mainly be described in relation to a heavy-duty vehicle, i.e. a truck, they may also be applicable for other types of vehicles using a fluid pump for generate a steering assist force.

BACKGROUND

Steering system in vehicles are continuously developed to meet the demands from the market, mainly in terms of improving the steering feeling for an operator controlling the vehicle. The steering system generally forms part of a steering assist system arranged to generate a steering force for steer assist during a turning maneuver.

A conventional steering assist system for e.g. heavy-duty vehicles, uses a fluid pump connected to a steering system, such as a steering gear, in order to generate the steering force. The steering assist system uses the vehicle velocity as well as a wheel angle to generate a steering force.

Although the steering assist system generates a sufficient steering force during a turning maneuver, the conventional steering assist system are contributing to a substantial amount of energy consumption of the vehicle. There is thus a desire to reduce the energy consumption associated with the steering assist operation.

SUMMARY

It is an object of the present disclosure to describe a method which at least partially overcomes the above-described deficiencies.

According to a first aspect, there is provided a method for controlling a steering assist system of a vehicle; the steering assist system comprising a fluid pump connected to a steering system of the vehicle, wherein the fluid pump is arranged to supply a flow of fluid for generating a steering assist force to a wheel of the vehicle during operation, the method comprising: obtaining a signal indicative of a road characteristics of a road segment operable by the vehicle; determining a required wheel angle for operating the vehicle during the road segment; determining a desired steering assist force to be applied to the wheel based on the required wheel angle; and controlling the flow of fluid supplied by the fluid pump based on the steering assist force when operating the vehicle at the road segment.

The steering system may for example include a steering wheel, as well as a steering gear. Thus, the fluid pump is preferably connected to the steering gear of the steering system, if such steering gear is present.

Moreover, the road characteristics of the road segment should be construed as e.g. a curvature of the road at which the vehicle is driving, or the road curvature of an upcoming road segment ahead of the vehicle. The road characteristics thus presents an indication of the road curvature and serve as an input for how much steering needed for sufficiently handle the steering maneuver associated with the curvature. As will be described further below, the characteristics of the road segment may be determined by e.g. a GPS, a camera, or other suitable positioning device.

Further, the steering assist system should be construed as applicable for any steerable wheels of the vehicle. Thus, the present disclosure can be applied to the front steerable wheels as well as to steerable wheels of e.g. a tag axle or a pusher axle of the vehicle.

An advantage is that data indicative of the road curvature can be used as an input parameter for controlling the flow of fluid supplied by the fluid pump during the turning maneuver. In particular, the fluid pump can be controlled to supply a sufficient amount of fluid flow for the specific wheel angle associated with the road curvature. In further detail, the fluid pump does not need to be operated at its full operational capacity if not required to. On the contrary, for a turning maneuver requiring a low wheel angle, the fluid pump can be controlled to reduce its operational capacity to handle that specific low wheel angle. The overall energy consumption of the fluid pump can hereby be reduced as the fluid pump will not need to continuously operate at its full capacity.

According to an example embodiment, the flow of fluid supplied by the fluid pump may be controlled proportionally to the desired steering assist force.

The wording "proportionally" should be construed such that the fluid pump can be controlled to supply a low level of fluid during substantially straight-ahead driving, and to increase the flow of fluid proportionally to the desired steering assist force. When the required wheel angle is determined to be above a predetermined maximum wheel angle limit, the fluid pump may be controlled to its maximum capacity.

According to an example embodiment, the method may further comprise: obtaining a signal indicative of a parameter value relating to a lateral acceleration of the vehicle; and controlling the flow of fluid supplied by the fluid pump based on the steering assist force and the lateral acceleration.

The parameter value relating to the lateral acceleration may, for example, be the instantaneous lateral acceleration exposed to a wheel of the vehicle, or another parameter that can serve as an input parameter for calculating or determining the lateral acceleration. According to an example embodiment, the signal indicative of a parameter value relating to the lateral acceleration may be received from an acceleration sensor when operating the vehicle during the road segment.

An advantage of also using the lateral acceleration as an input for controlling the flow of fluid supplied by the fluid pump is that, in case the signal indicative of the road characteristics is lost or for other reason not available, the steering assist force can still be provided. Preferably, the flow of fluid supplied by the fluid pump is controlled proportionally to the lateral acceleration.

According to an example embodiment, the method may further comprise: obtaining a signal indicative of an applied steering wheel torque applied by a vehicle operator; and controlling the flow of fluid supplied by the fluid pump based on the steering assist force and the applied steering wheel torque.

An advantage is thus that during, for example, overtaking of another vehicle where the road segment is substantially straight, i.e. "free from" curvatures, the steering assist system can still generate a steering assist force. Preferably, the flow of fluid supplied by the fluid pump is controlled proportionally to the applied steering wheel torque.

According to an example embodiment, the method may further comprise: comparing the required wheel angle with a predetermined threshold angle; and reducing the flow of fluid supplied by the fluid pump to a lower steering assist force limit when the required wheel angle is below the predetermined threshold wheel angle.

Hereby, the steering assist system will generate a low level of steering assist force even during e.g. straight-ahead driving. A reduction to the low level of steering assist force will thus substantially reduce the energy consumption when the vehicle is operated at a road segment with no substantial curvatures. According to an example embodiment, the lower steering assist force limit may be between 20%-40% of a maximum steering assist force capacity/capability of the fluid pump.

According to an example embodiment, the predetermined threshold wheel angle may between 0-2 degrees. This range is a preferred indication that the vehicle is driving substantially straight ahead.

According to an example embodiment, the fluid pump may be a hydraulic fluid pump arranged to supply a flow of a hydraulic fluid for generating the steering assist force. A hydraulic fluid pump is beneficial as it can handle relatively high steering assist forces.

According to an example embodiment, the steering assist system may further comprise a positioning system, the positioning system being arranged to determine the road characteristics of the road segment. According to an example embodiment, the positioning system may be one of a global positioning system (GPS), a satellite positioning system (GNSS), a road ahead camera arranged on the vehicle, or predefined road map data. The data received by the positioning system is preferably transmitted to a control unit for controlling the steering assist system, and in turn the flow of fluid supplied by the fluid pump.

According to an example embodiment, the fluid pump may be connected to an internal combustion engine of the vehicle for operation of the fluid pump. The fluid pump may comprise a valve for controlling the supply of fluid flow, wherein the method comprises: controlling the flow of fluid supplied by the fluid pump by controlling an openness degree of the valve. According to another example embodiment, the fluid pump may be connected to an electric machine of the vehicle for controlling operation of the fluid pump, the method comprising: controlling the flow of fluid supplied by the fluid pump by electrically controlling a rotational velocity of the electric machine.

Thus, the method is applicable for vehicles operated by an internal combustion engine as well operated by an electric machine. The present disclosure is also applicable for both manually operated vehicles as well as autonomously controlled vehicles.

According to a second aspect, there is provided a steering assist system of a vehicle, the steering assist system comprising a positioning system; a fluid pump connected to a steering system of the vehicle, wherein the fluid pump is arranged to supply a flow of fluid for generating a steering assist force to a wheel of the vehicle during operation; and a control unit arranged to communicate with the positioning system, wherein the control unit is configured to obtain a signal from the positioning system, the signal being indicative of a road characteristics of a road segment operable by the vehicle; determine a required wheel angle for operating the vehicle during the road segment; determine a desired steering assist force to be applied to the wheel based on the required steering angle; and control the fluid pump to supply a flow of fluid based on the steering assist force when operating the vehicle at the road segment.

Effects and features of the second aspect are largely analogous to those described above in relation to the first aspect. Thus, features described in the first aspect are equally applicable for the system defined by the second aspect.

According to a third aspect, there is provided a computer readable medium carrying a computer program comprising program code means for performing the steps of any one of the embodiments described above in relation to the first aspect when the program means is run on a computer.

According to a fourth aspect, there is provided a computer program comprising program code means for performing the steps of any one of the embodiments described above in relation to the first aspect when the program is run on a computer.

Effects and features of the third and fourth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
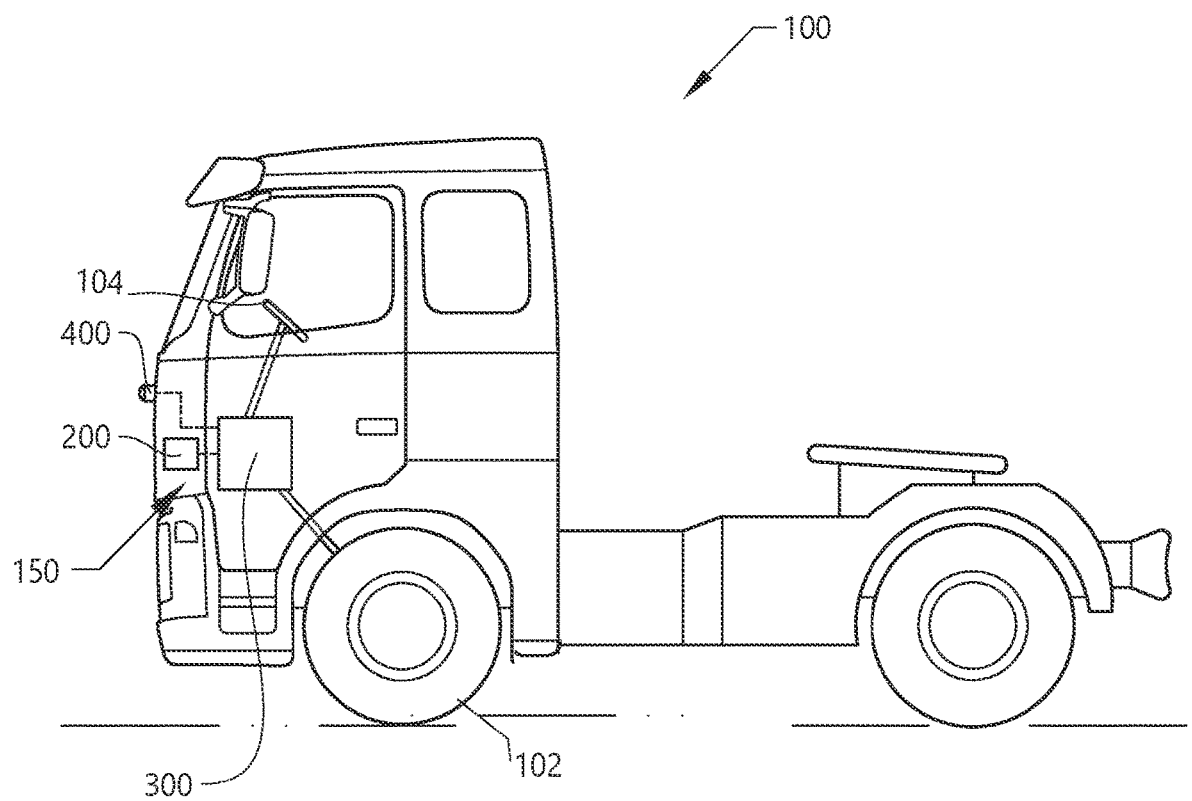
FIG. 1 is a lateral side view illustrating a vehicle in the form of a truck, which is arranged to utilize a steering assist system according to an example embodiment.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 100 in the form of a truck. The vehicle 100 comprises a pair of steerable wheels 102 connected to a steering wheel 104 of the vehicle 100. The vehicle also comprises a steering assist system 150 for steering assist during operation of the vehicle 100. In the exemplified embodiment, the steering assist system 150 comprises a steering system 300 connected to the wheels 102 as well as to the steering wheel 104. The steering assist system 150 further comprises a positioning system 200, 400, in the following also exemplified as a GPS 200 and a camera 400 arranged to visually determine the characteristics of the road ahead of the vehicle 100. Although FIG. 1 illustrates a positioning system comprising both a camera 400 and a GPS 200, the present disclosure is not limited to the use of both of these devices, it is equally applicable with the use of only one of them.

Figure 2:
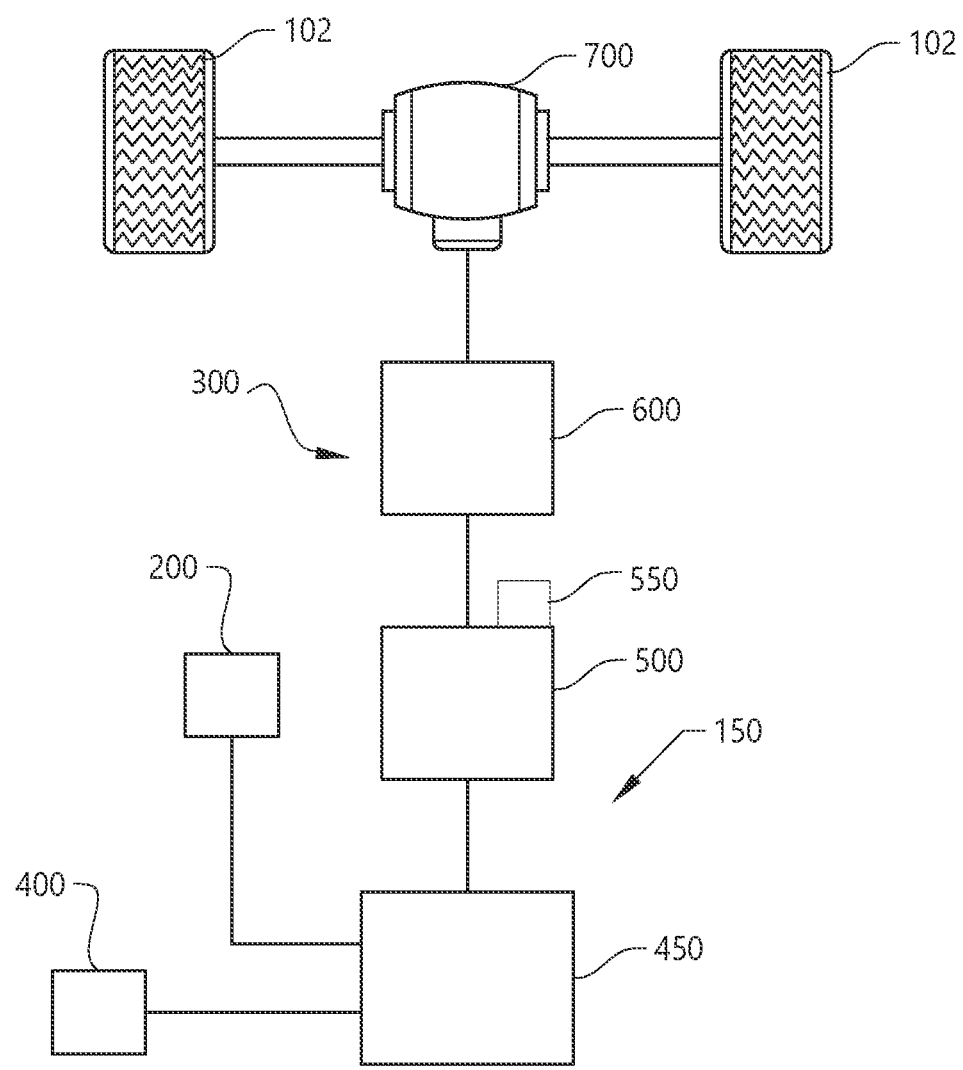
FIG. 2 is a schematic illustration of a steering assist system according to an example embodiment.

In order to describe the steering system 150 and its functionalities in further detail, reference is made to FIG. 2, which is a schematic illustration of the steering assist system 150 according to an example embodiment. As can be seen, and as briefly described above, the steering assist system 150 comprises the positioning system 200, 400, a fluid pump 500 connected to the steering system 300 of the vehicle, and a control unit 450 arranged in communication with the positioning system 200, 400 and the fluid pump 500. As will also be described in further detail below, the control unit 450 is arranged to receive control signal(s) from the positioning system and to control the fluid pump 500 based on this/these signals.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

In the exemplified embodiment depicted in FIG. 2, the steering system comprises a steering gear 600 and a cardan joint 700 connecting the fluid pump 500 to the steerable wheels 102. The fluid pump 500 is thus arranged to supply a flow of fluid for generating a steering assist force to the steerable wheels 102 of the vehicle during e.g. a turning maneuver.

The fluid pump is preferably arranged as a hydraulic fluid pump 500 configured to generate the steering assist force to the steerable wheels 102 by supplying a flow of hydraulic fluid for operation of the fluid pump 500. According to an example embodiment, the fluid pump can be connected to a prime mover 550, in the form of an internal combustion engine, of the vehicle for controlling operation thereof. In such a case, the flow of fluid supplied by the fluid pump can be controlled by means of a valve (not shown). In further detail, the operational capacity, and thus in turn the steering assist force generated to the steerable wheels, is controlled by controlling the openness degree of the valve. When reducing the flow of fluid through the valve, the operational capacity of the fluid pump will be reduced, whereby a reduced steering assist force is generated.

According to another example embodiment, the fluid pump can instead be connected to, and controlled by, a prime mover 550 in the form of an electric machine. In such a case, the flow of fluid supplied by the fluid pump 500 is controlled by controlling the rotational velocity of the electric machine. Thus, an increased rotational velocity generates an increased supply of fluid flow, and in turn an increased steering assist force.

Figure 3:
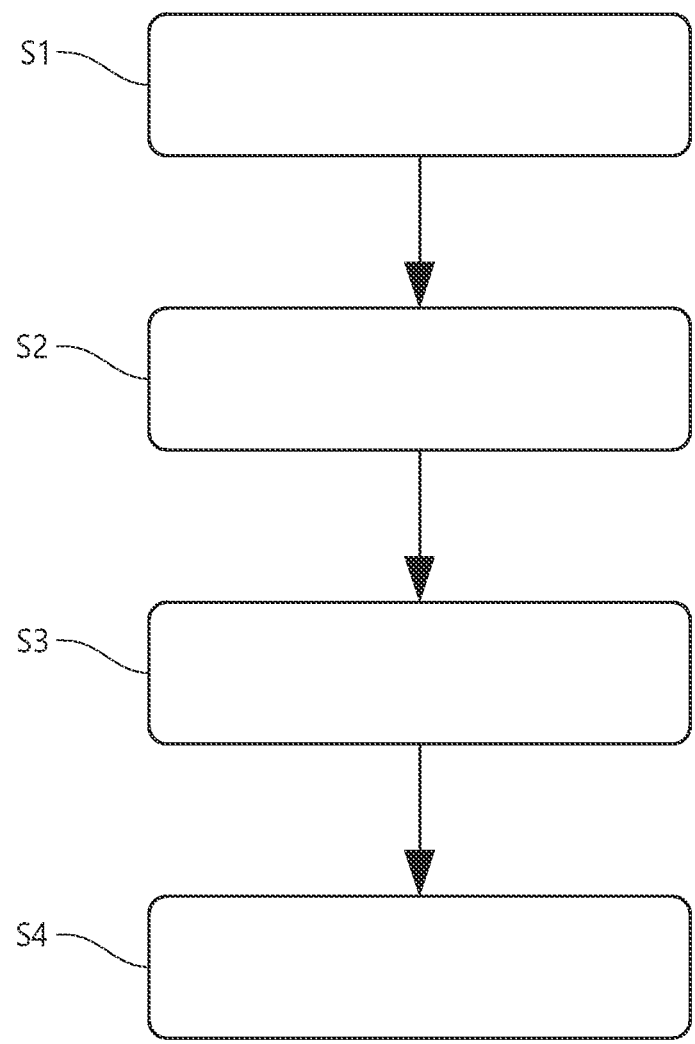
FIG. 3 is a flow chart of a method for controlling the steering assist system according to an example embodiment.

In order to describe the functionality of controlling the steering assist system 150 in further detail, reference is made to FIG. 3, in combination with the features illustrated in FIG. 2.

During operation of the vehicle, a signal indicative of the road characteristics of a road segment operable by the vehicle is obtained S1 by the control unit 450. Preferably, and as described above, the signal is received from the positioning system 200, 400. Hereby, the control unit 450 receives data indicative of the upcoming road characteristics, e.g. the curvature of the road. Based on the road characteristics, the control unit 450 determines S2 a required steering angle of the steerable wheels 102, whereby the determined required steering angle is sufficient for operating the vehicle during the road segment.

The control unit 450 further determines S3, based on the required steering angle, a desired steering assist force to be applied to the steerable wheels 102 of the vehicle. When the vehicle 100 is operated at the road segment, the control unit 450 controls S4 the flow of fluid supplied by the fluid pump 500 based on the determined steering assist force. As described above, the flow of fluid can be controlled by a valve or by the rotational velocity of an electric machine depending on the current application and type of vehicle.

By means of the above described control functionality of the fluid pump 500, the fluid pump 500 is not operated at its full capacity if not needed to. Preferably, the flow of fluid supplied by the fluid pump is controlled proportionally to the desired steering assist force. According to a non-limiting example, if the desired steering assist force is determined to be 70% of its full capacity, the fluid pump 500 is controlled to supply a flow of fluid of approximately 70% of its full flow capacity.

Preferably, the fluid pump is controlled to always maintain a minimum steering assist force. If the road segment is substantially straight, i.e. comprising no curvature, the fluid pump 500 is preferably controlled to supply a flow of fluid to generate a lower steering assist force. The lower steering assist force is preferably between 20-40% of a maximum steering assist force capacity of the fluid pump 500. The steering assist force is thus preferably increased proportionally from the lower steering assist force level up to its full capacity.

The above described fluid pump 500 may also be controlled based on a signal received from an acceleration sensor (not shown). The acceleration sensor is in such a case arranged to obtain a current lateral acceleration of the vehicle. The lateral acceleration signal is transmitted to the control unit 450, whereby the control unit 450 controls the fluid pump 500 to supply a flow of fluid also based on the determined lateral acceleration. As a further option, the control unit 450 can receive a signal indicative of a current steering wheel torque applied by an operator of the vehicle. In such a case, the control unit controls the flow of fluid supplied by the fluid pump 500 also based on the applied steering wheel torque.

It is to be understood that the present disclosure is not limited to the embodiments described above and illustrated in the drawings; rather, the skilled person will recognize that many changes and modifications may be made within the scope of the appended claims.

The invention claimed is:

1. A method for controlling a steering assist system of a vehicle, comprising:
   obtaining a signal indicative of road characteristics of a road segment operable by a vehicle;
   determining a required wheel angle for operating the vehicle during the road segment;
   determining a desired steering assist force to be applied to a wheel based on the required wheel angle; and
   controlling flow of fluid supplied by a fluid pump of the steering assist system based on the steering assist force when operating the vehicle at the road segment to generate the steering assist force to the wheel of the vehicle during operation, the fluid pump connected to a steering system of the vehicle.

2. The method of claim 1, wherein the flow of fluid supplied by the fluid pump is controlled proportionally to the desired steering assist force.

3. The method of claim 1, further comprising:
obtaining a signal indicative of a parameter value relating to a lateral acceleration of the vehicle; and
controlling the flow of fluid supplied by the fluid pump based on the steering assist force and the lateral acceleration.

4. The method of claim 3, wherein the signal indicative of the parameter value relating to the lateral acceleration is received from an acceleration sensor when operating the vehicle during the road segment.

5. The method of claim 1, further comprising:
obtaining a signal indicative of an applied steering wheel torque applied by a vehicle operator; and
controlling the flow of fluid supplied by the fluid pump based on the steering assist force and the applied steering wheel torque.

6. The method of claim 1, further comprising:
comparing the required wheel angle with a predetermined threshold angle; and
reducing the flow of fluid supplied by the fluid pump to a lower steering assist force limit when the required wheel angle is below the predetermined threshold wheel angle.

7. The method of claim 6, wherein the lower steering assist force limit is between 20%-40% of a maximum steering assist force capacity of the fluid pump.

8. The method of claim 6, wherein the predetermined threshold wheel angle is between 0-2 degrees.

9. The method of claim 1, wherein the fluid pump is a hydraulic fluid pump arranged to supply a flow of a hydraulic fluid for generating the steering assist force.

10. The method of claim 1, wherein the steering assist system further comprises a positioning system, the positioning system being arranged to determine the road characteristics of the road segment.

11. The method of claim 1, wherein the fluid pump is connected to an internal combustion engine of the vehicle for operation of the fluid pump, the fluid pump comprising a valve for controlling the supply of fluid flow, wherein the method further comprises:
controlling the flow of fluid supplied by the fluid pump by controlling an openness degree of the valve.

12. The method of claim 1, wherein the fluid pump is connected to an electric machine of the vehicle for controlling operation of the fluid pump, the method further comprising:
controlling the flow of fluid supplied by the fluid pump by electrically controlling a rotational velocity of the electric machine.

13. A steering assist system of a vehicle, the steering assist system comprising:
a positioning system;
a fluid pump connected to a steering system of the vehicle, wherein the fluid pump is arranged to supply a flow of fluid for generating a steering assist force to a wheel of the vehicle during operation; and
a control unit arranged to communicate with the positioning system, wherein the control unit is configured to:
obtain a signal from the positioning system, the signal being indicative of road characteristics of a road segment operable by the vehicle;
determine a required wheel angle for operating the vehicle during the road segment;
determine a desired steering assist force to be applied to the wheel based on the required steering angle; and
control the fluid pump to supply a flow of fluid based on the steering assist force when operating the vehicle at the road segment.

* * * * *